S. W. WOODLAND.
PLOW HITCH SHIFTER.
APPLICATION FILED DEC. 13, 1917.

1,281,470. Patented Oct. 15, 1918.

WITNESSES

INVENTOR
Silas W. Woodland,
BY
ATTORNEY

UNITED STATES PATENT OFFICE.

SILAS WILLIAM WOODLAND, OF ROXBORO, WASHINGTON.

PLOW-HITCH SHIFTER.

1,281,470.　　　　　Specification of Letters Patent.　　Patented Oct. 15, 1918.

Application filed December 13, 1917.　Serial No. 206,970.

*To all whom it may concern:*

Be it known that I, SILAS WILLIAM WOODLAND, a citizen of the United States, residing at Roxboro, in the county of Adams and State of Washington, have invented certain new and useful Improvements in Plow-Hitch Shifters, of which the following is a specification.

This invention relates to a hitch for connecting a plow, or a series of plows to a tractor or other motor vehicles, and has for its object the production of a simple and efficient means for efficiently attaching a plow, or plows, to a tractor for causing the plow or plows to follow or keep in the furrows.

Another object of this invention is the production of a simple and efficient means for causing the hitch to automatically shift, as the steering wheel is turned.

With these and other objects in view, this invention consists of certain constructions, combinations, and arrangement of parts, as will be hereinafter fully described and claimed.

Figure 1:
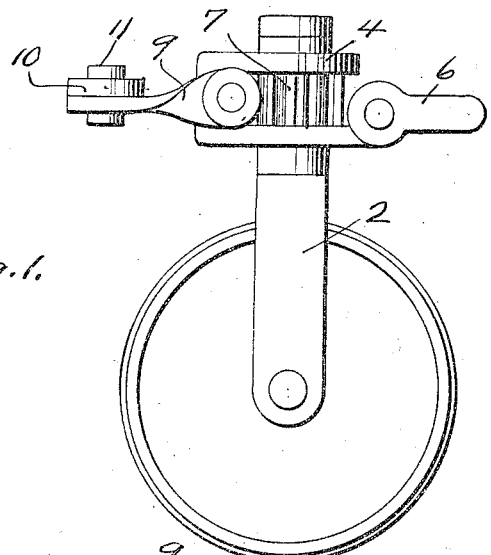
Figure 1 is a side elevation of the improved hitch.
Figure 2:
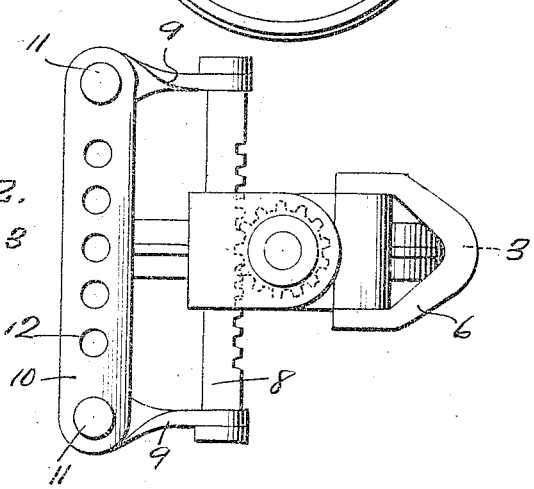
Fig. 2 is a top plan view of the improved hitch.
Figure 3:
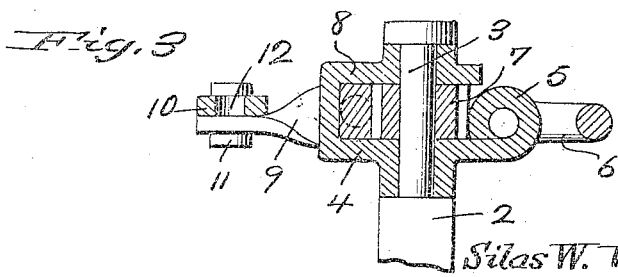
Fig. 3 is a section taken on line 3—3 of Fig. 2, the steering wheel being removed therefrom.

By referring to the drawings, it will be seen that 1 designates the steering wheel upon which is supported a fork 2. This fork 2 is provided with a reduced upwardly extending shank 3 which upwardly extending shank 3 extends through a substantially U-shaped connecting strap 4. This connecting strap 4 is provided with a rolled forward end 5 for constituting a journal for the hitching link 6. A pinion 7 is carried by and secured to the reduced neck of the shank and this pinion meshes with a rack bar 8 as shown clearly in Figs. 2 and 3 of the drawings. The rack bar 8 is connected at its respective ends to the links 9 which links 9 are connected to the plow hitch plate 10 at their rear ends by means of the pivot pins 11. This plow hitch plate 10 is provided with a plurality of adjusting apertures 12 for the purpose of permitting the adjustable connection of a plow beam therewith.

It should be understood that the link 6 will constitute a clevis for attaching the plow hitch to a draft means such as a tractor or other suitable engine. As the steering wheel 1 turns in one direction, the pinion 7 will rotate with the reduced neck 3 and as the pinion 7 rotates, the rack bar 8 will be shifted and permit the bar 8 to be moved laterally, thereby consituting a substantially flexible connection between the plows and the draft means, in this manner causing the plows to keep within the furrows even though the tractor or draft means should not be capable of turning a sharp corner.

Considerable difficulty has been found in keeping the plows, which are drawn by a tractor within the furrows, when the tractor changes its direction of travel. By means of the present device, however, the plows will be allowed to remain or keep within the furrows due to the lateral shifting of the draft hitch which connects the plows with the tractor.

It of course should be understood that certain detail mechanical changes may be made in the present invention without departing from the spirit thereof so long as these changes fall within the scope of the appended claims.

What I claim is:

1. A plow hitch comprising a hitching plate, a steering wheel, a clevis supported upon said steering wheel, and a laterally shifting connection formed between said steering wheel and said hitching plate and adapted to shift laterally as said steering wheel changes its direction of travel.

2. A hitch of the class described, comprising a hitching plate, a rack bar, links for pivotally connecting said hitching plate to said rack bar, a steering wheel, a steering fork, said steering fork provided with an upwardly extending end, a substantially U-shaped plate carried by said upwardly extending end, a pinion carried by said upwardly extending end, said pinion meshing with said rack bar and adapted to shift the same laterally as said steering wheel is swung, and a connecting clevis secured to said substantially U-shaped plate.

3. A hitch of the class described, comprising a hitching plate, connecting links secured thereto, a rack bar connected to said links, a substantially U-shaped plate incasing a portion of said rack bar, said plate provided with a forward rolled end, a clevis link secured within said forward rolled end, a steering wheel, a supporting fork carried by said wheel and extending through said plate, a pinion carried by said supporting fork and meshing with said rack for shifting said rack laterally as said steering wheel is swung.

4. A plow hitch comprising a hitching plate, a steering wheel, a clevis supported upon said steering wheel, a rack bar carried by said hitching plate, and a pinion carried by said steering wheel and adapted to engage said rack bar for shifting said hitching plate laterally as said steering wheel changes its direction of travel.

In testimony whereof I affix my signature in presence of two witnesses.

SILAS WILLIAM WOODLAND.

Witnesses:
H. S. SNEAD,
C. H. FINK.